US012567630B2

(12) United States Patent
Lee et al.

(10) Patent No.: US 12,567,630 B2
(45) Date of Patent: Mar. 3, 2026

(54) RECHARGEABLE BATTERY

(71) Applicant: SK On Co., Ltd., Seoul (KR)

(72) Inventors: Seung Hun Lee, Daejeon (KR); Suk Chan Kim, Daejeon (KR); Yea Eun Kim, Daejeon (KR); Soo Jy Ryu, Daejeon (KR); Se Hwan Oh, Daejeon (KR)

(73) Assignee: SK On Co., Ltd., Seoul (KR)

( * ) Notice: Subject to any disclaimer, the term of this patent is extended or adjusted under 35 U.S.C. 154(b) by 605 days.

(21) Appl. No.: 17/861,780

(22) Filed: Jul. 11, 2022

(65) Prior Publication Data

US 2023/0114353 A1 Apr. 13, 2023

(30) Foreign Application Priority Data

Oct. 6, 2021 (KR) ........................ 10-2021-0132351

(51) Int. Cl.
H01M 50/176 (2021.01)
H01M 50/169 (2021.01)
(Continued)

(52) U.S. Cl.
CPC ....... H01M 50/176 (2021.01); H01M 50/169 (2021.01); H01M 50/188 (2021.01); H01M 50/30 (2021.01); *H01M 2220/20* (2013.01)

(58) Field of Classification Search
CPC ............. H01M 50/0585; H01M 50/11; H01M 50/15; H01M 50/30; H01M 50/55;
(Continued)

(56) References Cited

U.S. PATENT DOCUMENTS

| | | | |
|---|---|---|---|
| 2012/0141850 A1 | 6/2012 | Jeong | |
| 2014/0308575 A1 | 10/2014 | Kim et al. | |
| 2016/0315301 A1 | 10/2016 | Kim et al. | |
| 2016/0372793 A1* | 12/2016 | Lee | H01M 10/0585 |

(Continued)

FOREIGN PATENT DOCUMENTS

| | | |
|---|---|---|
| CN | 101162768 A | 4/2008 |
| CN | 111834578 A | 10/2020 |

(Continued)

OTHER PUBLICATIONS

Extended European Search Report for the European Patent Application No. 22186097.6 issued by the European Patent Office on Dec. 21, 2022.

(Continued)

*Primary Examiner* — Allison Bourke
*Assistant Examiner* — Travis L. Martin
(74) *Attorney, Agent, or Firm* — IP & T GROUP LLP

(57) ABSTRACT

A rechargeable battery includes an electrode assembly including a first electrode plate, a second electrode plate, and a separator, a case accommodating the electrode assembly and having both ends open, a first cap plate coupled to one end of the case, a second cap plate coupled to the other end of the case, a first cover member disposed to cover the first cap plate and including a first electrode terminal exposed upwardly, and a second cover member disposed to cover the second cap plate and including a second electrode terminal exposed upwardly. A first electrode lead of the electrode assembly passes through the first cap plate to be electrically connected to the first electrode terminal of the first cover member, and a second electrode lead of the electrode assembly passes through the second cap plate to be electrically connected to the second electrode terminal of the second cover member.

13 Claims, 5 Drawing Sheets

(51) Int. Cl.
  *H01M 50/188* (2021.01)
  *H01M 50/30* (2021.01)
(58) Field of Classification Search
  CPC ............. H01M 50/103; H01M 50/109; H01M
    50/176; H01M 50/186; H01M 50/533;
    H01M 50/543; H01M 50/547; H01M
    50/548; H01M 50/552; H01M 50/553;
    H01M 50/557; H01M 50/169
  See application file for complete search history.

(56) References Cited

U.S. PATENT DOCUMENTS

| | | | |
|---|---|---|---|
| 2017/0104193 A1 | 4/2017 | Kang | |
| 2018/0205043 A1 | 7/2018 | Kwon et al. | |
| 2020/0076025 A1 | 3/2020 | Jo et al. | |
| 2020/0303713 A1 | 9/2020 | Lee et al. | |
| 2021/0066685 A1 | 3/2021 | Lee et al. | |
| 2022/0302533 A1* | 9/2022 | Choi | H01M 50/147 |
| 2022/0302549 A1* | 9/2022 | Choi | H01M 50/548 |
| 2023/0187791 A1* | 6/2023 | Xiao | H01M 50/588 |
| | | | 429/179 |
| 2023/0216163 A1* | 7/2023 | Deng | H01M 50/103 |
| | | | 429/185 |

FOREIGN PATENT DOCUMENTS

| | | |
|---|---|---|
| CN | 213989024 U | 8/2021 |
| KR | 10-2012-0061235 A | 6/2012 |
| KR | 10-2016-0126157 A | 11/2016 |
| KR | 10-2017-0041376 A | 4/2017 |
| KR | 10-2017-0050081 A | 5/2017 |
| KR | 10-2019-0064887 A | 6/2019 |
| KR | 10-2070369 B1 | 1/2020 |
| KR | 10-2020-0086958 A | 7/2020 |
| KR | 10-2020-0111498 A | 9/2020 |

OTHER PUBLICATIONS

Office Action for Korean Patent Application No. 10-2021-0132351 issued by the Korean Intellectual Property Office (KIPO) on Feb. 25, 2025.
Notice of Allowance (=Notification to Grant Patent Right for Invention) for Korean Patent Application No. 10-2021-0132351 issued by the Korean Patent Office on Oct. 2, 2025.
Office Action for Chinese Patent Application No. 202210809142.7 issued by the Chinese Patent Office on Nov. 15, 2025.

* cited by examiner

RECHARGEABLE BATTERY

CROSS-REFERENCE TO RELATED APPLICATION(S)

This application claims benefit of priority to Korean Patent Application No. 10-2021-0132351 filed on Oct. 6, 2021 in the Korean Intellectual Property Office, the disclosure of which is incorporated herein by reference in its entirety.

BACKGROUND

1. Field

The present disclosure relates to a rechargeable battery.

2. Description of Related Art

Prismatic lithium-ion batteries used for electric vehicles are generally narrower in width and thicker, as compared to pouch-type batteries. In this case, the number of electrode assemblies manufactured through winding or stacking increases, and thus a large investment cost is required. In addition, when a width of a prismatic cell is increased, dimensional stability of a case may be deteriorated and a welding length of a cap plate may become longer, making process control difficult.

SUMMARY

An aspect of the present disclosure provides a rechargeable battery capable of reducing a welding length of a cap plate.

Another aspect of the present disclosure provides a rechargeable battery allowing a direction of a vent to be oriented toward a lower portion of a case during venting.

Another aspect of the present disclosure provides a rechargeable battery capable of reducing the number of electrode assemblies by increasing a size of an electrode assembly accommodated in a case.

According to an aspect of the present disclosure, a rechargeable battery may include an electrode assembly including a first electrode plate, a second electrode plate, and a separator, a case accommodating the electrode assembly and having both ends open, a first cap plate coupled to one end of the case, a second cap plate coupled to the other end of the case, a first cover member disposed to cover the first cap plate and including a first electrode terminal exposed upwardly, and a second cover member disposed to cover the second cap plate and including a second electrode terminal exposed upwardly. A first electrode lead of the electrode assembly may pass through the first cap plate to be electrically connected to the first electrode terminal of the first cover member, and a second electrode lead of the electrode assembly may pass through the second cap plate to be electrically connected to the second electrode terminal of the second cover member.

According to the present disclosure, a welding length of a cap plate may be reduced, thereby improving efficiency of a manufacturing process, and allowing for easy management of the manufacturing process.

In addition, according to the present disclosure, a direction of a vent may be allowed to be oriented toward a lower portion of a case during venting, thereby improving stability.

In addition, according to the present disclosure, a size of an electrode assembly accommodated in a case may be increased, thereby improving energy efficiency.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
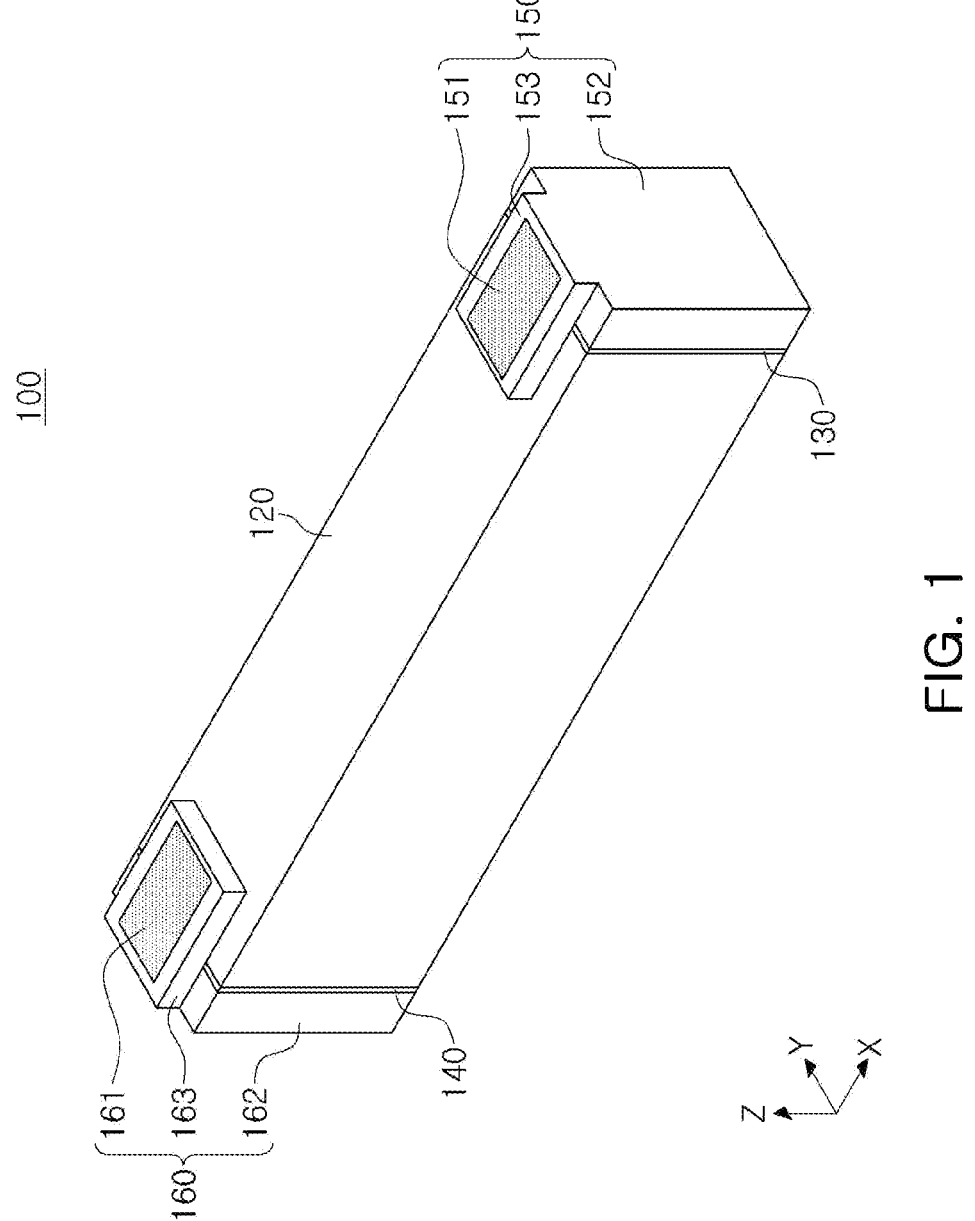
FIG. 1 is a perspective view illustrating a rechargeable battery according to an example embodiment of the present disclosure.

Hereinafter, preferred example embodiments of the present disclosure will be described with reference to the accompanying drawings. However, the present disclosure is not limited to the example embodiments described below, but can be implemented in various different forms. The example embodiments are merely provided so that the present disclosure is thorough and complete, and fully conveys the scope of the present disclosure to those skilled in the art. Shapes and sizes of elements in the drawings may be exaggerated for clearer description.

Figure 2:
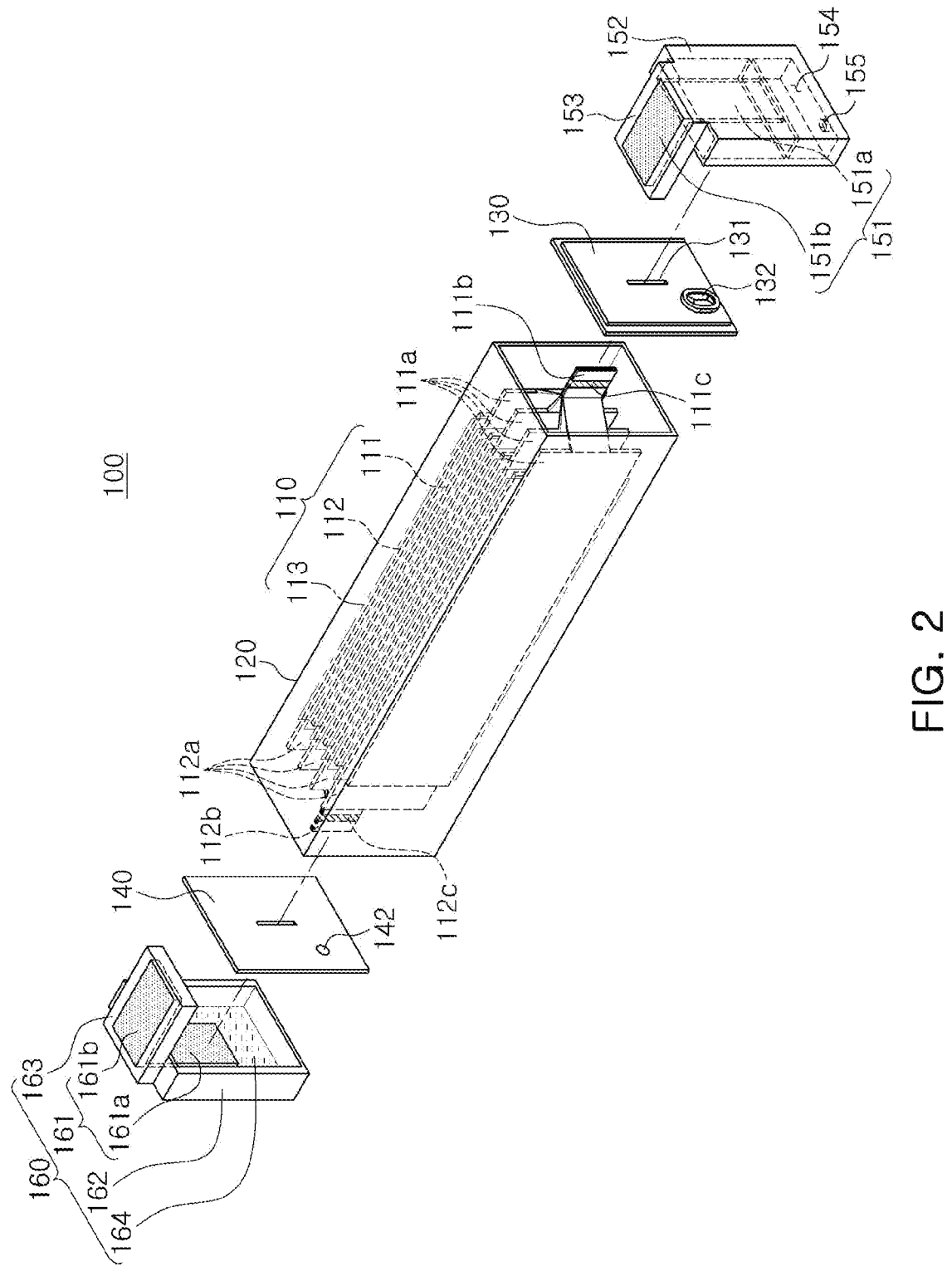
FIG. 2 is an exploded perspective view illustrating a rechargeable battery according to an example embodiment of the present disclosure.
Figure 3:
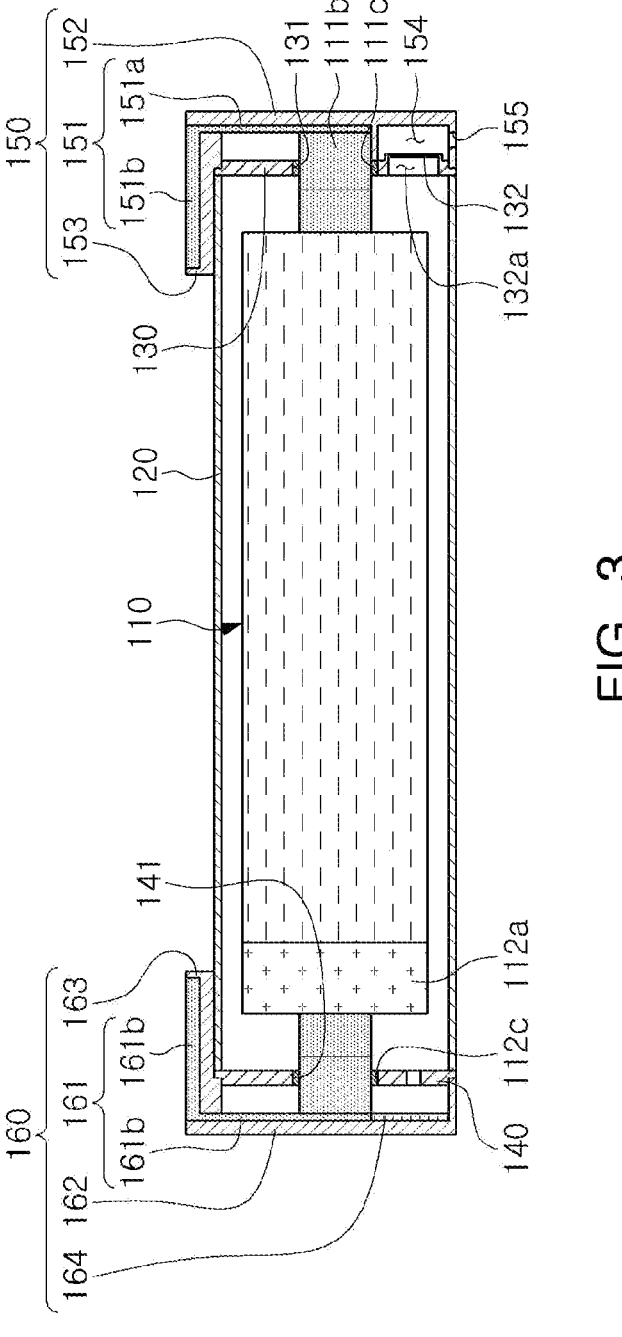
FIG. 3 is a cross-sectional view illustrating a rechargeable battery according to an example embodiment of the present disclosure.

FIG. 1 is a perspective view illustrating a rechargeable battery according to an example embodiment of the present disclosure. FIG. 2 is an exploded perspective view illustrating a rechargeable battery according to an example embodiment of the present disclosure. FIG. 3 is a cross-sectional view illustrating a rechargeable battery according to an example embodiment of the present disclosure;

Referring to FIGS. 1 to 3, a rechargeable battery 100 according to an example embodiment of the present disclosure may include, for example, an electrode assembly 110, a case 120, a first cap plate 130, a second cap plate 140, a first cover member 150, and a second cover member 160.

The electrode assembly 110 may include a first electrode plate 111, a second electrode plate 112, and a separator 113 formed in the form of a thin plate or a film, and may be formed in various forms as necessary, such as a stacked type, a wound type, or the like. For example, the first electrode plate 111 may serve as a cathode, and the second electrode plate 112 may serve as an anode.

The first electrode plate 111 may be formed by coating a first electrode active material such as graphite or carbon on a first electrode current collector formed of, for example, a metal foil such as copper, a copper alloy, nickel, or a nickel alloy. In addition, the first electrode plate 111 may include a first electrode uncoated portion 111*a* that is an area in which the first electrode active material is not coated. The first electrode uncoated portion 111*a* may serve as a passage for current flow between the first electrode plate 111 and the outside of the first electrode plate 111. The first electrode plate 111 may include a first electrode lead 111*b* connected to the first electrode uncoated portion 111*a*. The first electrode lead 111*b* may be disposed to pass through the first cap plate 130, and a sealing film 111*c* for sealing the first cap plate 130 may be wound on the first electrode lead 111*b*. For example, the first electrode lead 111*b* may be installed to be joined to the first electrode uncoated portion 111*a* by welding. In addition, the first electrode lead 111*b* may be formed of copper or a copper alloy.

The second electrode plate 112 may be formed by, for example, coating a second electrode active material such as a transition metal oxide on a second electrode current collector formed of a metal foil such as aluminum or an aluminum alloy. In addition, the second electrode plate 112 may include a second electrode uncoated portion 112*a* that is an area in which the second electrode active material is not coated. The second electrode uncoated portion 112*a* may also serve as a passage for current flow between the second electrode plate 112 and the outside of the second electrode plate 112. The second electrode plate 112 may include a second electrode lead 112*b* connected to the second electrode uncoated portion 112*a*. The second electrode lead 112*b* may be disposed to pass through the second cap plate 140, and a sealing film 112*c* for sealing the second cap plate 140 may be wound on the second electrode lead 112*b*. For example, the second electrode lead 112*b* may be installed to be joined to the second electrode uncoated portion 112*a* by welding. In addition, the second electrode lead 112*b* may be formed of aluminum or an aluminum alloy.

The separator 113 may be positioned between the first electrode plate 111 and the second electrode plate 112 to prevent short circuit and enable movement of lithium ions. For example, the separator 113 may be formed of polyethylene, polypropylene, or a composite film of polyethylene and polypropylene.

The first electrode plate 111, the second electrode 112, and the separator 113 may be arranged in a width direction (a Y-axis direction of FIG. 1) of the case 120. Accordingly, a volume occupied by the electrode assembly 110 in the case 120 may be increased, thereby improving energy efficiency. Here, with respect to a term for a direction, a longitudinal direction denotes an X-axis direction of FIG. 1, and a height direction denotes a Z-axis direction of FIG. 1.

In other words, the electrode assembly 110 may have a length in the longitudinal direction greater than a length in the width direction and a length in the height direction.

The electrode assembly 110 may be accommodated in the case 120 together with an electrolyte. The electrolyte may be formed of a lithium salt such as LiPF$_6$ or LiBF$_4$ in an organic solvent such as ethylene carbonate (EC), propylene carbonate (PC), diethyl carbonate (DEC), ethylmethyl carbonate (EMC), or dimethyl carbonate (DMC). In addition, the electrolyte may be in a liquid or gel form.

The case 120 may have a rectangular parallelepiped box shape with both ends open, and the electrode assembly 110 may be accommodated in the case 120. The case 120 may be manufactured by injection molding, thereby reducing manufacturing costs. For example, the case 120 may be formed of a metal such as aluminum or stainless steel to provide mechanical strength of the rechargeable battery 100.

The first cap plate 130 may be coupled to one end of the case 120. For example, the case 120 and the first cap plate 130 may be joined to each other by welding. The first cap plate 130 may be formed of, for example, a metal such as aluminum or stainless steel. In addition, the first cap plate 130 may include a first through-hole 131 through which a first electrode lead of a first electrode passes, and the first electrode lead may pass through the first through-hole 131 to be exposed externally. In addition, the first electrode lead may include a sealing film, and thus, the first through-hole 131 may be sealed. The first cap plate 130 may include a venting hole 132*a* for discharging gas when internal pressure of an inner space sealed by the case 120 and the first and second cap plates 130 and 140 increases. A vent member 132 may be installed in the venting hole 132*a*. When the internal pressure increases above a predetermined pressure, the vent member 132 may be damaged, and thus may serve to allow internal gas to be discharged externally. In addition, one surface of the first cap plate 130 may have a stepped edge for coupling with the first cover member 150.

The second cap plate 140 may be coupled to the other end of the case 120. For example, the case 120 and the second cap plate 140 may be joined to each other by welding. The second cap plate 140 may be formed of, for example, a metal such as aluminum or stainless steel. In addition, the second cap plate 140 may include a second through-hole 141 through which a second electrode lead of a second electrode passes, and the second electrode lead may pass through the second through-hole 141 to be exposed externally. In addition, the second electrode lead may include a sealing film, and thus the second through-hole 141 may be sealed. The second cap plate 140 may include an electrolyte injection port 142 for injecting an electrolyte into an inner space formed by the case 120 and the first and second cap plates 130 and 140. In addition, the electrolyte injection port 142 may be closed by a closure member (not illustrated) when the injection of the electrolyte is completed. In addition, one surface of the second cap plate 140 may have a stepped edge for coupling with the second cover member 160.

The first cap plate 130 and the second cap plate 140 may be joined to the case 120 by welding, and a length of a circumference of an upper surface of the case 120 may be greater than a sum of lengths of circumferences of both ends of the case 120. That is, welding lengths of the first and second cap plates 130 and 140 may be formed to be shorter than that of a case in which a cap plate is installed on an upper surface of a case according to related art. Accordingly, it may be convenient to set and manage a process condition of a joining process by welding. In addition, a risk of leakage of an electrolyte according to welding quality may be reduced.

Figure 4:
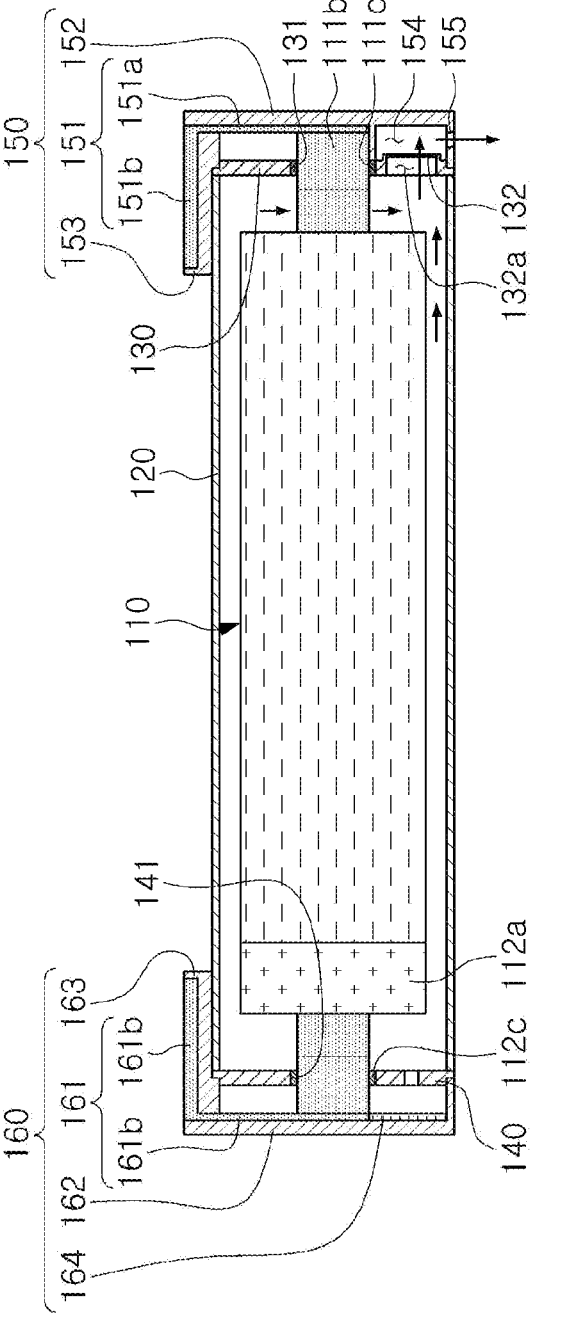
FIG. 4 is a schematic diagram illustrating gas discharge of a rechargeable battery according to an example embodiment of the present disclosure.

The first cover member 150 may be disposed to cover the first cap plate 130, and may include a first electrode terminal 151 exposed upwardly. For example, the first cover member 150 may include a first body 152 covering the first cap plate 130, and a first extension portion 153 extending from an upper surface of the first body 152 to be disposed on the upper surface of the case 120. The first body 152 and the first extension portion 153 may be disposed to be substantially perpendicular to each other. The first electrode terminal 151 may include a first junction portion 151*a* disposed on the first body 152, and a first terminal portion 151*b* connected to the first junction portion 151*a* and exposed to an upper surface of the first extension portion 153. For example, the first terminal portion 151*b* may have a thickness greater than that of the first junction portion 151*a*, and the first terminal portion 151*b* and the first junction portion 151*a* may be disposed to be substantially perpendicular to each other. The first cover member 150 may include a flow path portion 154 disposed opposite to the venting hole 132*a* of the first cap plate 130, the flow path portion 154 into which gas discharged from the case 120 is introduced, and a discharge port 155 for discharging the gas toward a lower portion of the case 120. Accordingly, the gas discharged from the case 120 may be discharged toward the lower portion of the case 120 through the flow path portion 154 and the discharge port 155 of the first cover member 150, as illustrated in more detail in FIG. 4. Accordingly, even when the rechargeable battery 100 is mounted for use with a vehicle, the gas discharged from the case 120 may not be discharged toward the rechargeable battery 100 disposed adjacently or upwardly. Thus, even when the rechargeable battery 100 is mounted for use with a vehicle, the gas may be ejected to a lower side of the rechargeable battery 100, thereby reducing discomfort given to a vehicle occupant.

The second cover member 160 may be disposed to cover the second cap plate 140, and may include a second electrode terminal 152 exposed through an upper portion thereof. For example, the second cover member 160 may include a second body 162 covering the second cap plate 140, and a second extension portion 163 extending from an upper surface of the second body 162 to be disposed on the upper surface of the case 120. The second body 162 and the second extension portion 163 may be disposed to be substantially perpendicular to each other. The second electrode terminal 161 may include a second junction portion 161a disposed on the second body 162, and a second terminal portion 161b connected to the second junction portion 161a and exposed to an upper surface of the second extension portion 163. For example, the second terminal portion 161b may have a thickness greater than that of the second junction portion 161a, and the second terminal portion 161b and the second junction portion 161a may be disposed to be substantially perpendicular to each other. The second cover member 160 may include an insulating layer 164 for insulating the second electrode terminal 161, the insulating layer 164 disposed around the second junction portion 161a.

Figure 5:
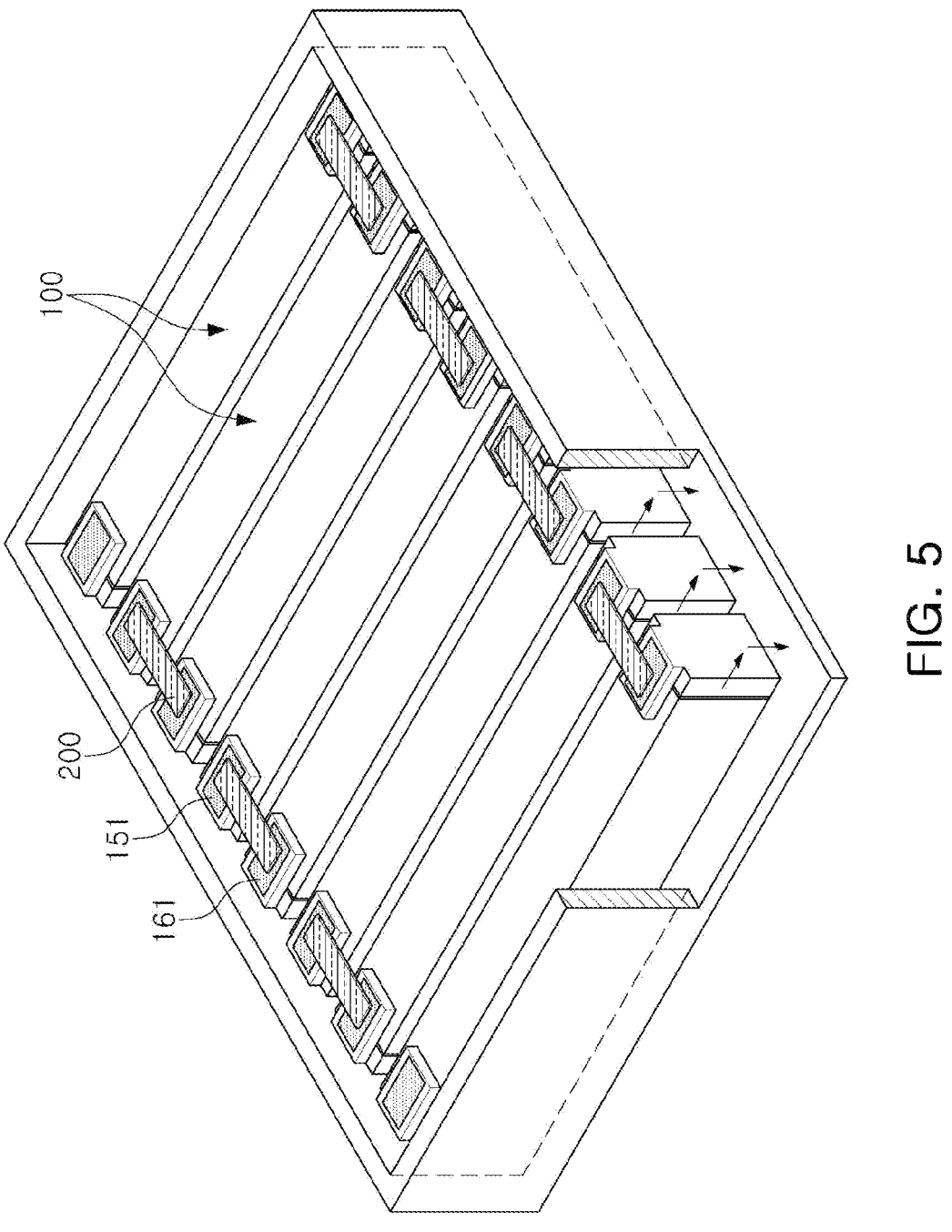
FIG. 5 is a schematic diagram illustrating a case in which a rechargeable battery is installed in a vehicle according to an example embodiment of the present disclosure.

As illustrated in FIG. 5, when a plurality of rechargeable batteries 100 are manufactured as a module to be installed in a vehicle or ESS system, a bus bar 200 may be installed on first and second electrodes 151 and 161 disposed on an upper portion of the case 120, thereby improving efficiency of a manufacturing process.

In addition, as described above, when the vent member 132 is damaged due to an increase in internal pressure of the rechargeable battery 100, and accordingly gas is discharged, a direction of the gas being discharged may be oriented toward the lower portion of the case 120. Accordingly, even when the rechargeable battery 100 is mounted for use with a vehicle, discomfort given to a vehicle occupant by gas ejection may be reduced.

In addition, a direction of the electrode assembly 110 being stacked may be set to a width direction of the case 120, and thus the number of electrodes required for stacking may be reduced, thereby reducing manufacturing costs during mass production.

In addition, the first and second cap plates 130 and 140 may be joined to the both ends of the case 120, and thus welding lengths thereof may be reduced, so that it may be convenient to set and manage a process condition. In addition, a risk of leakage of an electrolyte due to welding quality may be reduced.

In addition, a volume of the electrode assembly 110 accommodated in the case 120 may be increased compared to a volume of the same case 120, thereby improving energy efficiency.

While example embodiments have been shown and described above, it will be apparent to those skilled in the art that modifications and variations could be made without departing from the scope of the present disclosure as defined by the appended claims.

What is claimed is:

1. A rechargeable battery comprising:
an electrode assembly including a first electrode plate, a second electrode plate, and a separator;
a case accommodating the electrode assembly and having both ends open;
a first cap plate coupled to one end of the case;
a second cap plate coupled to the other end of the case;
a first cover member disposed to cover the first cap plate in a longitudinal direction of the case and including a first electrode terminal exposed on a top portion of the case; and
a second cover member disposed to cover the second cap plate in the longitudinal direction of the case and including a second electrode terminal exposed on the top portion of the case,
wherein a first electrode lead of the electrode assembly passes through a first through-hole of the first cap plate to be electrically connected to the first electrode terminal of the first cover member,
a second electrode lead of the electrode assembly passes through a second through-hole of the second cap plate to be electrically connected to the second electrode terminal of the second cover member,
the first cover member covers at least a portion of a top surface of the case in a height direction of the case perpendicular to the longitudinal direction of the case,
the second cover member covers at least a portion of the top surface of the case in the height direction of the case,
at least one of the first cap plate and the second cap plate is formed of a metal material, and
at least one of the first cap plate and the second cap plate is joined to the case by welding.
2. The rechargeable battery of claim 1, wherein
the first cap plate includes a vent member installed in a venting hole for discharging gas when internal pressure is increased, and
the first cover member includes a flow path portion disposed opposite to the venting hole, the flow path portion into which gas discharged from the case is introduced, and a discharge port for discharging the gas toward a lower portion of the case.
3. The rechargeable battery of claim 1, wherein the second cover member includes an insulating layer for insulating the second electrode terminal.
4. The rechargeable battery of claim 1, wherein the second cap plate includes an electrolyte injection port for injecting an electrolyte into the case.
5. The rechargeable battery of claim 1, wherein the first cover member includes a first body covering the first cap plate in the longitudinal direction of the case, and a first extension portion extending from a top surface of the first body and disposed on the top surface of the case in the height direction of the case.
6. The rechargeable battery of claim 5, wherein the first electrode terminal includes a first junction portion disposed on the first body, and a first terminal portion connected to the first junction portion and exposed to an upper surface of the first extension portion.

7. The rechargeable battery of claim 2, wherein the second cover member includes a second body covering the second cap plate in the longitudinal direction of the case, and a second extension portion extending from a top surface of the second body and disposed on the top surface of the case in the height direction of the case.

8. The rechargeable battery of claim 7, wherein the second electrode terminal includes a second junction portion disposed on the second body, and a second terminal portion connected to the second junction portion and exposed to an upper surface of the second extension portion.

9. The rechargeable battery of claim 1, wherein the first electrode plate, the second electrode plate, and the separator of the electrode assembly are arranged in a width direction of the case, the width direction of the case being perpendicular to the longitudinal and the height direction of the case.

10. The rechargeable battery of claim 1, wherein a sealing film for sealing the case is installed on the first and second electrode leads.

11. The rechargeable battery of claim 1, wherein
a length of a circumference of the top surface of the case is greater than a sum of lengths of circumferences of the both ends of the case.

12. The rechargeable battery of claim 1, wherein the electrode assembly has a length in a longitudinal direction greater than a length in a width direction and a length in a height direction.

13. The rechargeable battery of claim 1, wherein
the first electrode lead is disposed toward one end of the case in the longitudinal direction of the case and connected to the first electrode terminal, and
the second electrode lead is disposed toward the other end of the case in the longitudinal direction of the case and connected to the second electrode terminal, and
the first electrode terminal is connected to the first electrode lead at one end of the case, and have a shape of being bent so that one end thereof is exposed on the top portion of the case in the height direction of the case, and
the second electrode terminal is connected to the second electrode lead at the other end of the case, and have a shaped of being bent so that one end thereof is exposed on the top portion of the case in the height direction of the case.

\* \* \* \* \*